(12) United States Patent
Bismans et al.

(10) Patent No.: US 9,074,651 B2
(45) Date of Patent: Jul. 7, 2015

(54) DUAL RANGE DAMPING SYSTEM FOR A SHOCK ABSORBER

(71) Applicant: Tenneco Automotive Operating Company Inc., Lake Forest, IL (US)

(72) Inventors: Gunther Bismans, Alken (BE); Mark Nowaczyk, Heers (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 213 days.

(21) Appl. No.: 13/849,581

(22) Filed: Mar. 25, 2013

(65) Prior Publication Data

US 2014/0000998 A1 Jan. 2, 2014

Related U.S. Application Data

(60) Provisional application No. 61/666,977, filed on Jul. 2, 2012.

(51) Int. Cl.
*F16F 9/48* (2006.01)
*F16F 9/18* (2006.01)

(52) U.S. Cl.
CPC .... *F16F 9/48* (2013.01); *F16F 9/18* (2013.01)

(58) Field of Classification Search
USPC ........................................................ 188/284
See application file for complete search history.

(56) References Cited

U.S. PATENT DOCUMENTS

| 4,854,429 | A | | 8/1989 | Casey | |
|---|---|---|---|---|---|
| 5,129,488 | A | | 7/1992 | Furuya et al. | |
| 5,152,379 | A | | 10/1992 | Sackett et al. | |
| 5,690,195 | A | * | 11/1997 | Kruckemeyer et al. | .... 188/282.5 |
| 6,044,939 | A | | 4/2000 | Forster | |
| 6,668,986 | B2 | * | 12/2003 | Moradmand et al. | ......... 188/267 |
| 6,729,446 | B2 | * | 5/2004 | Sakai et al. | ................ 188/266.2 |
| 7,111,711 | B2 | | 9/2006 | Grundei | |
| 7,395,907 | B2 | | 7/2008 | de Kock et al. | |
| 2002/0121415 | A1 | * | 9/2002 | Hartel | ........................ 188/282.2 |

OTHER PUBLICATIONS

Search Report and Written Opinion in corresponding PCT Application No. PCT/US2013/040318 dated Sep. 23, 2013 (10 pages).

* cited by examiner

*Primary Examiner* — Melanie Torres Williams
(74) *Attorney, Agent, or Firm* — Harness, Dickey & Pierce, P.L.C.

(57) ABSTRACT

A shock absorber includes a piston assembly which includes separate flow paths. Each flow path is controlled by a valve assembly and each flow path is in parallel with the other two flow paths. One flow path will generate firm damping characteristics. A second flow path opens depending on either the frequency of the shock absorber movement or the amount of movement or stroke of the shock absorber. The third flow path includes an on/off control valve and generates a soft damping characteristic when the control valve is activated. The soft damping characteristic can be generated by a tunable bleed restriction or by a passive valve assembly.

20 Claims, 7 Drawing Sheets

DUAL RANGE DAMPING SYSTEM FOR A SHOCK ABSORBER

FIELD

The present disclosure relates to automotive shock absorbers. More particularly, the present disclosure relates to valve assemblies incorporated into the shock absorber which utilize a dual range damping system.

BACKGROUND

The statements in this section merely provide background information related to the present disclosure and may not constitute prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a fluid chamber defined by a pressure tube and is connected to the sprung mass of the vehicle through a piston rod. The pressure tube is connected to the unsprung mass of the vehicle. The piston divides the fluid chamber of the pressure tube into an upper working chamber and a lower working chamber. The piston includes compression valving which limits the flow of damping fluid from the lower working chamber to the upper working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced in the piston by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction and these valves can be designed such that they generate a damping force also.

The valve assemblies for the shock absorber have the function of controlling fluid flow between two chambers during the stroking of the shock absorber. By controlling the fluid flow between the two chambers, a pressure drop is built up between the two chambers and this contributes to the damping forces of the shock absorber. The valve assemblies can be used to tune the damping forces to control ride and handling as well as noise, vibration and harshness.

SUMMARY

This section provides a general summary of the disclosure, and is not a comprehensive disclosure of its full scope or all of its features.

The present disclosure is directed to a shock absorber which includes a dual range damping system. The dual range damping system has three parallel paths for fluid flow; one path includes a passive damping valve; a second path includes a passive damping valve with a damping characteristic which depends on the frequency of the shock absorber movement; the third flow path includes a tunable flow restriction that can be switched in parallel with the first two flow paths using a control valve. In various alternative embodiments, the passive damping valve with the damping characteristics which depend on the frequency of the shock absorber movement can be replaced by a stroke dependent damping valve assembly. In addition, the tunable flow restriction that can be switched in parallel with the first two flow paths using the control valve can be replaced with a passive damping valve with a soft damping characteristic which also can be switched in parallel with the first two flow paths.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION

The following description is merely exemplary in nature and is not intended to limit the present disclosure, application, or uses.

Figure 1:
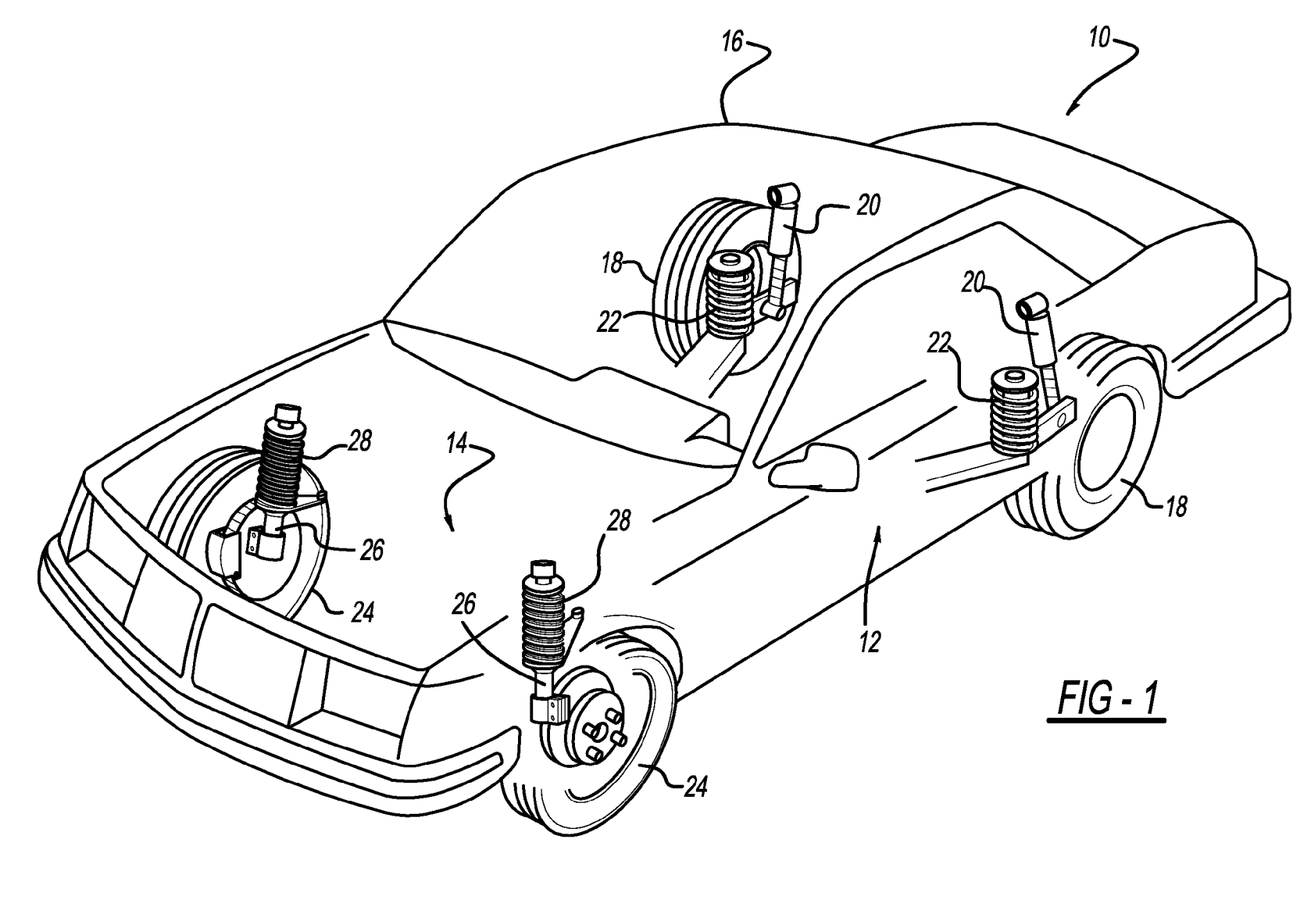
FIG. 1 is a schematic representation of a typical automobile which incorporates the two-stage valving in accordance with the present disclosure.

Referring now to the drawings in which like reference numerals designate like or corresponding parts throughout the several views, there is shown in FIG. 1 a vehicle which includes a suspension system incorporating the unique shock absorbers in accordance with the present disclosure and which is designated generally by the reference numeral 10.

Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include struts.

Figure 2:
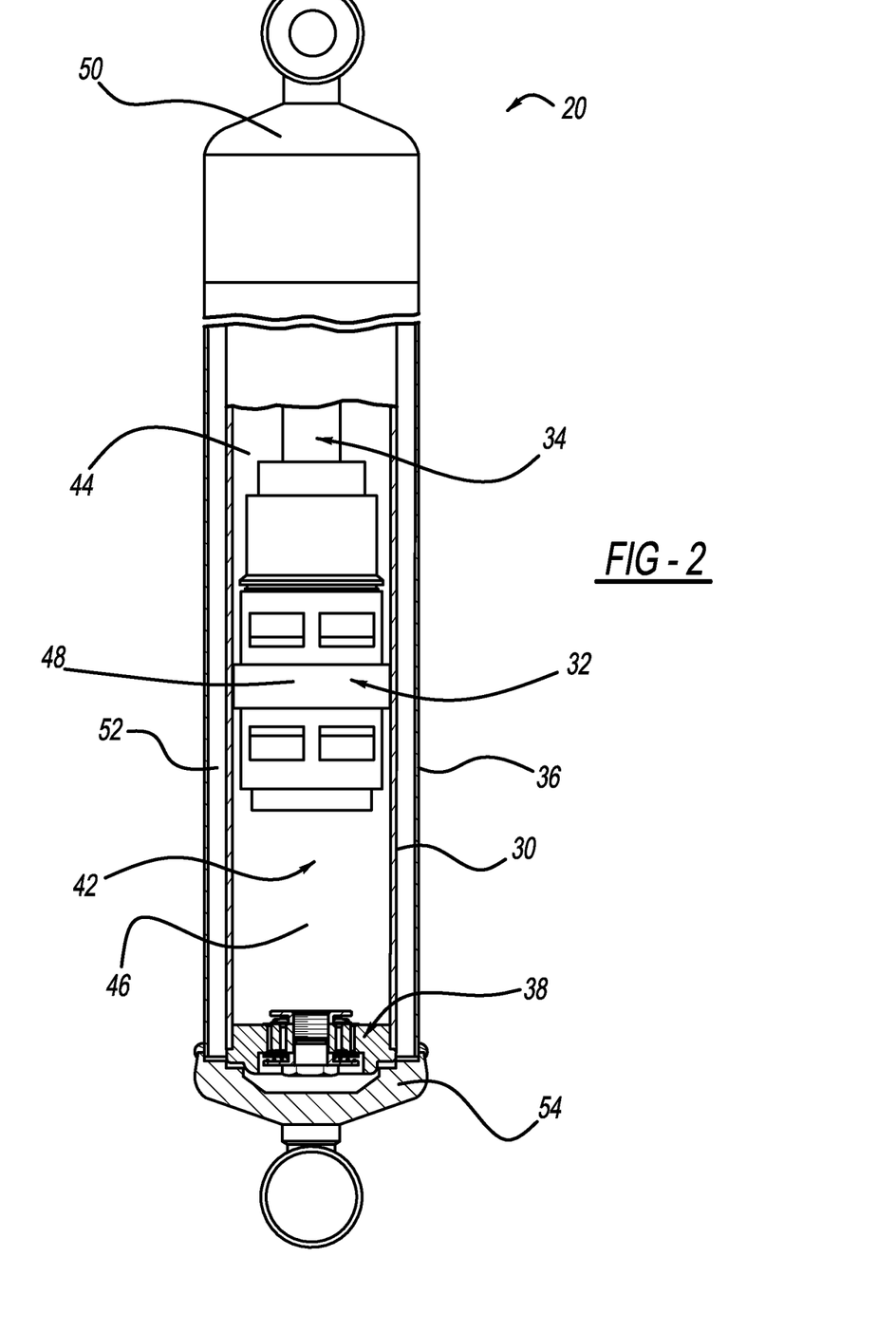
FIG. 2 is a side sectional view of the shock absorber in accordance with the present disclosure.

Referring now to FIG. 2, shock absorber 20 is shown in greater detail. While FIG. 2 illustrates only shock absorber 20, it is to be understood that shock absorber 26 also includes the unique valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod assembly 34, a reservoir tube 36 and a base valve assembly 38.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod assembly 34 is attached to piston assembly 32 and extends through upper working chamber 44 and through an upper end cap 50 which closes the upper end of pressure tube 30. A sealing system seals the interface between upper end cap 50, reservoir tube 36 and piston rod assembly 34. The end of piston rod assembly 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod assembly 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
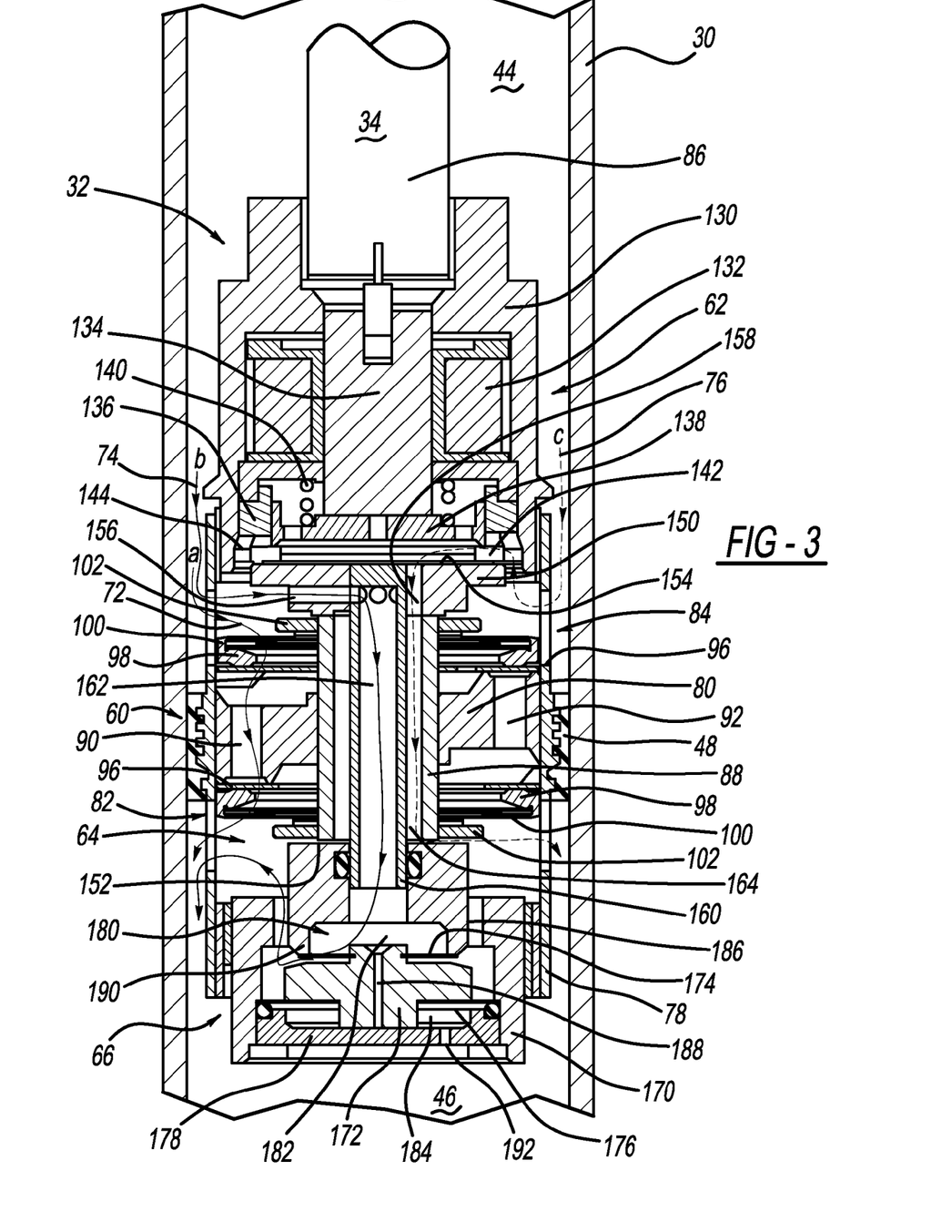
FIG. 3 is an enlarged cross-sectional view of the piston assembly in accordance with the present disclosure.

Referring now to FIG. 3, piston assembly 32 comprises a firm damping valve assembly 60, a control valve assembly 62, a tunable bleed restriction 64 and a frequency dependent damping valve assembly 66. While piston assembly 32 is illustrated having frequency dependent damping valve assembly 66, frequency dependent damping valve assembly 66 can be replaced by a stroke dependent valve assembly 68 (see FIG. 7 and discussion below). In addition, while piston assembly 32 is illustrated having tunable bleed restriction 64, tunable bleed restriction 64 can be replaced by a passive damping valve assembly 70 having a soft damping characteristic. (See FIG. 6 and the discussion below.) Control valve assembly 62 can be an on/off valve assembly or control valve assembly 62 can be a variable valve assembly to provide a variable flow.

Figure 4A:
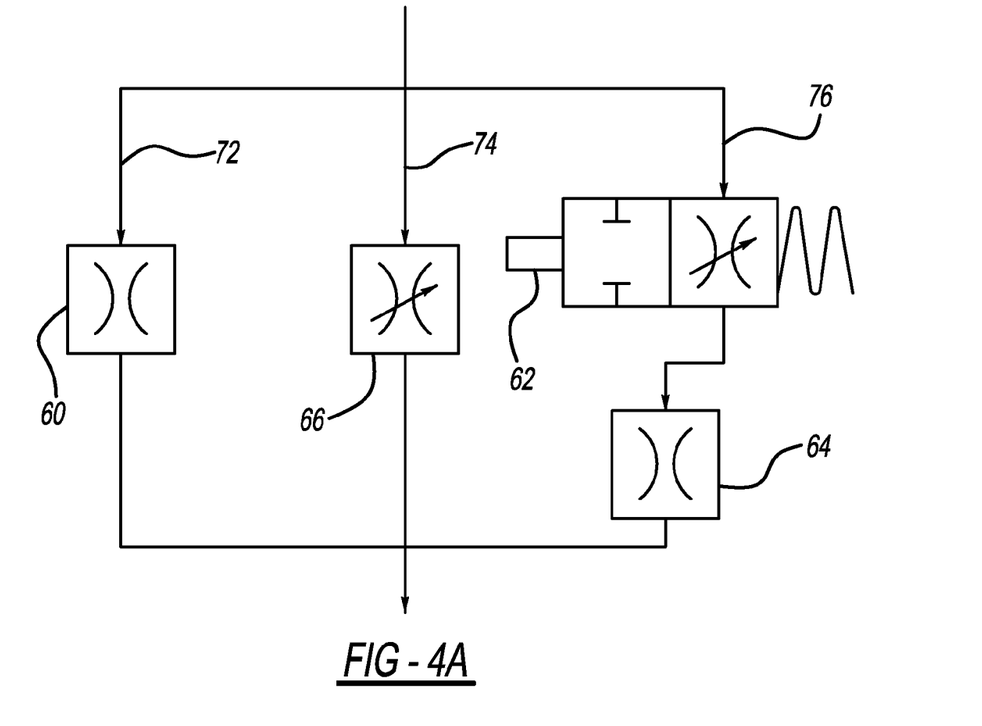
FIG. 4A is a schematic of the hydraulic valving system for the shock absorber illustrated in FIG. 2.
Figure 4B:
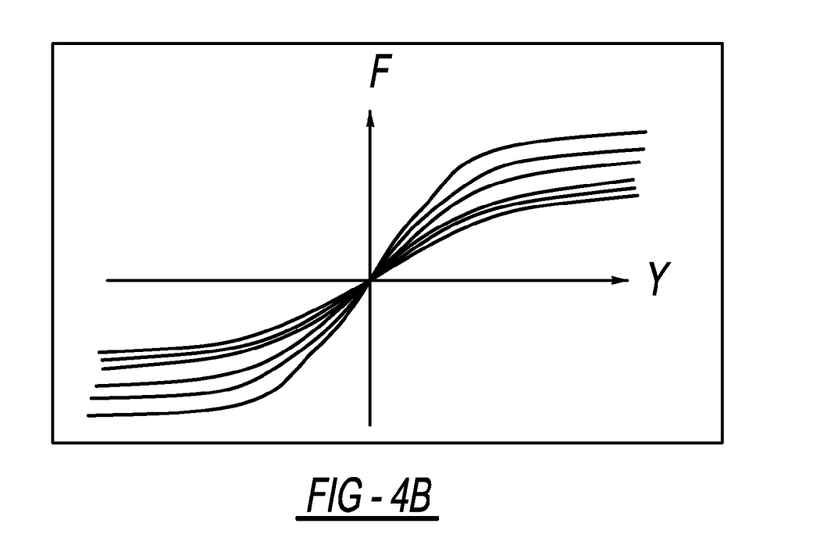
FIG. 4B is a graph illustrating the selective damping ranges achievable with the shock absorber illustrated in FIG. 2.
Figure 6:
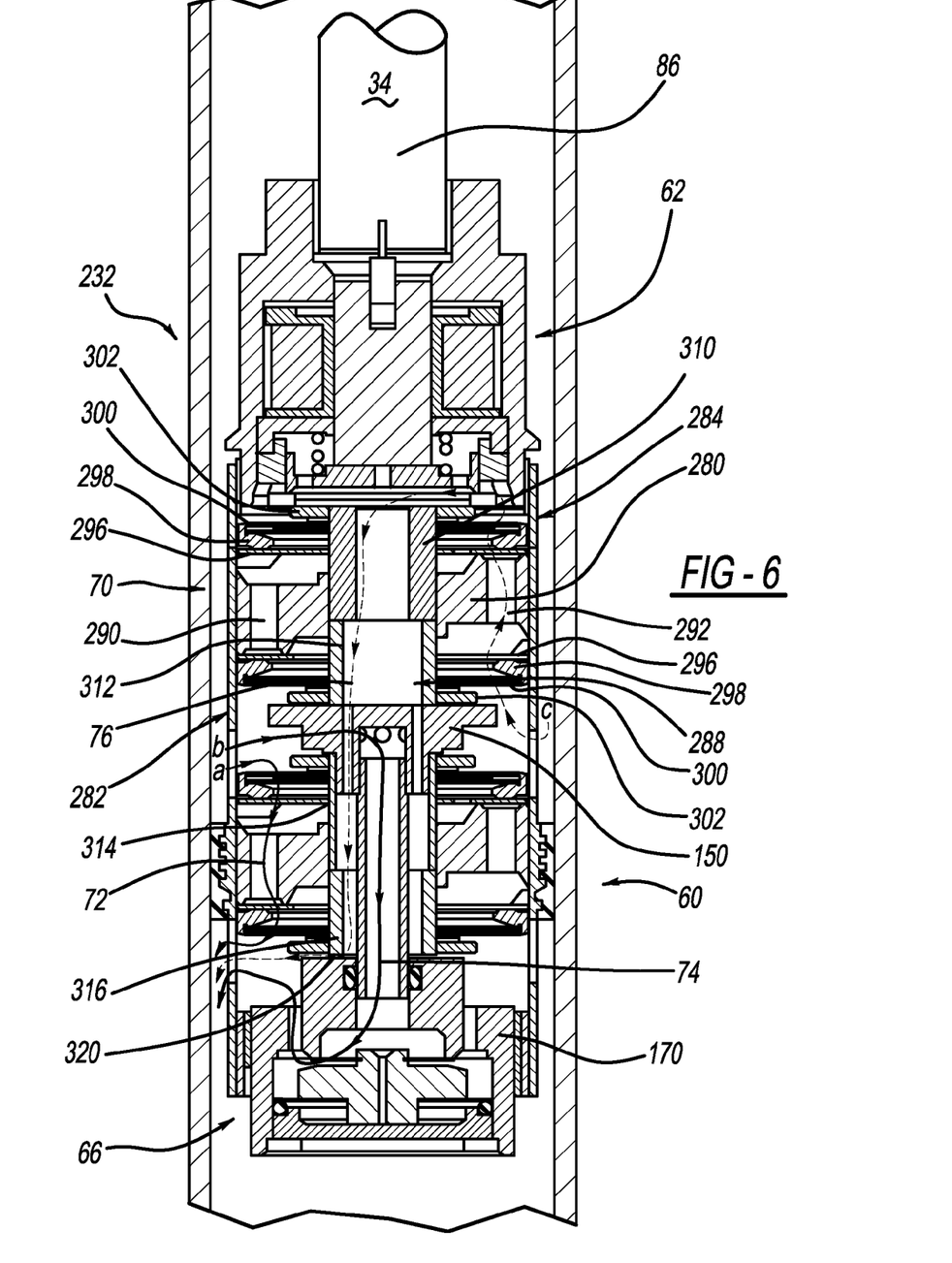
FIG. 6 is an enlarged cross-sectional view of a piston assembly in accordance with another embodiment of the present disclosure.

Piston assembly 32 is illustrated in conjunction with shock absorber 20 which is a dual tube shock absorber. It is within the scope of the present disclosure to utilize piston assembly 32 with a single or mono-tube shock absorber. Piston assembly 32 provides three parallel flow paths connecting upper working chamber 44 with lower working chamber 46 as illustrated schematically in FIG. 4A. A first flow path 72 (marked a) travels through firm damping valve assembly 60 which is a passive damping valve assembly with a firm damping characteristic. A second flow path 74 (marked b) travels through frequency dependent damping valve assembly 66. Second flow path 74 is in parallel with first flow path 72 and frequency dependent damping valve assembly 66 is a passive damping valve assembly with a damping characteristic which depends on the frequency of the movement of shock absorber 20. As discussed above, second flow path 74 could also include stroke dependent valve assembly 68 illustrated in FIG. 7. A third flow path 76 (marked c) travels through control valve assembly 62 and tunable bleed restriction 64. Third flow path 76 is in parallel with first flow path 72 and second flow path 74. As discussed above, tunable bleed restriction 64 can be replaced with passive damping valve assembly 70 which has a soft damping characteristic as illustrated in FIG. 6 and discussed below. FIG. 4B illustrates graphically the selectable damping ranges achievable using shock absorber 20 which has two damping characteristics both of which depend by itself on the frequency (or amplitude) of the movement of shock absorber 20.

First flow path 72 will generate firm damping characteristics when third flow path 76 is closed. Second flow path 74 will always provide a bypass flow path which opens depending on the frequency of movement of shock absorber 20 when frequency dependent damping valve assembly 66 is utilized or depending on the stroke of shock absorber 20 when stroke dependent valve assembly 68 is utilized. By opening third flow path 76, using control valve assembly 62, a softer damping characteristic can be generated. Also, when third flow path 76 is open, second flow path 74 will still offer a frequency dependent bypass flow path or a stroke dependent bypass flow path. A sleeve 78 attaches control valve assembly 62, tunable bleed restriction 64 and frequency dependent damping valve assembly 66 to firm damping valve assembly 60.

Referring again to FIG. 3, firm damping valve assembly 60 comprises a piston body 80, a rebound valve assembly 82 and a compression valve assembly 84. Piston body 80 is assembled between control valve assembly 62 and frequency dependent damping valve assembly 66. Piston rod assembly 34 comprises a main piston rod 86 and an intermediate piston rod 88.

Piston body 80 defines a plurality of rebound passages 90 and a plurality of compression passages 92. Seal 48 extends around piston body 80 and around sleeve 78 to provide a sealing relationship between piston assembly 32 and pressure tube 30.

Rebound valve assembly 82 comprises a valve disc 96, an interface 98, one or more interface discs 100, and a retainer 102. Valve disc 96 directly engages piston body 80 to close the plurality of rebound passages 90. Interface 98 directly engages the side of valve disc 96 opposite to piston body 80. The one or more interface discs 100 directly engage interface 98 and the one or more interface discs 100 create a biasing load that urges interface 98 towards valve disc 96 and valve disc 96 into engagement with piston body 80. Retainer 102 is moved axially along intermediate piston rod 88 to adjust the load created by the one or more interface discs 100. Once the specified load is created, retainer 102 is secured to intermediate piston rod 88 such that the specified load is created. During a rebound stroke, fluid pressure in upper working chamber 44 and within the plurality of rebound passages 90 will increase and fluid will flow through first flow path 72. Fluid will flow from upper working chamber 44 through sleeve 78 and will eventually overcome the load created by the one or more interface discs 100. Once the pressure increases both the entire valve disc 96 and the entire interface 98 will move axially with respect to intermediate piston rod 88 to open the plurality of rebound passages 90.

Compression valve assembly 84 comprises valve disc 96, interface 98, the one or more interface discs 100, and retainer 102. Valve disc 96 directly engages piston body 80 to close the plurality of compression passages 92. Interface 98 directly engages the side of valve disc 96 opposite to piston body 80. The one or more interface discs 100 directly engage interface 98 and the one or more interface discs 100 create a biasing load that urges interface 98 towards valve disc 96 and valve disc 96 into engagement with piston body 80. Retainer 102 is moved axially along intermediate piston rod 88 to adjust the load created by the one or more interface discs 100. Once the specified load is created, retainer 102 is secured to intermediate piston rod 88 such that the specified load is created. During a compression stroke, fluid pressure in lower working chamber 46 and within the plurality of compression passages 92 will increase and fluid will flow through first flow path 72. Fluid will flow from lower working chamber 46 through sleeve 78 and will eventually overcome the load created by the one or more interface discs 100. Once the pressure increases both the entire valve disc 96 and the entire interface 98 will move axially with respect to intermediate piston rod 88 to open the plurality of compression passages 92.

Control valve assembly 62 comprises a housing 130, a coil 132, an armature or magnet 134, a guiding ring 136 and a slider 138. Housing 130 is attached to piston rod assembly 34 by a threaded connection, welding or by other means known in the art. Coil 132 is located within housing 130 and coil 132 surrounds armature or magnet 134. When activated, coil 132 magnetizes armature or magnet 134 to attract slider 138 which moves axially within guiding ring 136.

A coil spring 140 biases slider 138 in a direction away from coil 132. Control valve assembly 62 prohibits fluid flow through tunable bleed restriction 64 when no power is supplied to coil 132 and slider 138 is biased away from coil 132. When power is supplied to coil 132, armature or magnet 134 becomes magnetized and moves slider 138 in a direction toward coil 132 to open tunable bleed restriction 64 as discussed below. Guiding ring 136 allows slider 138 to move axially with respect to guiding ring 136 and guiding ring 136 defines a stop 142 which limits the travel of slider 138 in a direction away from coil 132. Guiding ring 136 defines a plurality of apertures 144 which allow fluid flow to tunable bleed restriction 64 when control valve assembly 62 is activated.

Tunable bleed restriction 64 comprises an interface plate 150 and a tunable bleed disc 152. Interface plate 150 defines a valve seat 154 which interfaces with slider 138 of control valve assembly 62 to prohibit and allow fluid flow to tunable bleed disc 152. When coil 132 of control valve assembly 62 is not activated, coil spring 140 biases slider 138 against stop 142 prohibiting fluid flow to tunable bleed disc 152. When power is supplied to coil 132 to activate control valve assembly 62, armature or magnet 134 moves slider 138 away from valve seat 154 to allow fluid flow to tunable bleed disc 152. Interface plate 150 defines a plurality of radial apertures 156 and a plurality of axial apertures 158 which are separated from the plurality of radial apertures 156. Interface plate 150 also defines a central tube 160 which extends from valve seat 154 to sealingly engage frequency dependent damping valve assembly 66. Second flow path 74 extends from upper working chamber 44, through sleeve 78, through the plurality of radial apertures 156 and through a fluid passage 162 defined by central tube 160 to reach frequency dependent damping valve assembly 66. Third flow path 76 extends from upper working chamber 44, through sleeve 78, through the plurality of axial apertures 158 and through a fluid passage 164 defined between intermediate piston rod 88 and central tube 160 to reach tunable bleed disc 152. Intermediate piston rod 88 extends between interface plate 150 and frequency dependent damping valve assembly 66 generally coaxial with central tube 160. Tunable bleed disc 152 is disposed between intermediate piston rod 88 and frequency dependent damping valve assembly 66.

During a rebound stroke, fluid in upper working chamber 44 is pressurized and fluid will flow through third flow path 76 from upper working chamber 44, through sleeve 78, between slider 138 and valve seat 154 when control valve assembly 62 is activated, through the plurality of axial apertures 158, through fluid passage 164, through tunable bleed disc 152 and through sleeve 78 to lower working chamber 46. During a compression stroke, fluid in lower working chamber 46 is pressurized and fluid will flow through third flow path 76 from lower working chamber 46, through tunable bleed disc 152, through fluid passage 164, through axial apertures 158, between slider 138 and valve seat 154 when control valve assembly is activated, through sleeve 78 to upper working chamber 44.

Frequency dependent damping valve assembly 66 comprises a housing 170, a valve body 172, one or more valve discs 174, a diaphragm 176 and a retainer 178. Housing 170 defines a fluid chamber 180. Valve body 172 and diaphragm 176 divide fluid chamber 180 into an upper chamber 182 and a lower chamber 184. A passage 186 in housing 170 connects upper chamber 182 with lower working chamber 46 through sleeve 78. Valve body 172 is disposed within fluid chamber 180. Valve body 172 defines a passage 188 which connects fluid passage 162 to lower chamber 184. The one or more valve discs 174 extend between valve body 172 and a valve seat 190 defined by housing 170. Retainer 178 is attached to housing 170 to close lower chamber 184. A passageway 192 extends between lower chamber 184 and lower working chamber 46.

During a rebound stroke, fluid from fluid passage 162 enters frequency dependent damping valve assembly 66. A majority of the fluid will deflect the one or more valve discs 174 which will unseat from valve seat 190 allowing fluid flow to flow into upper chamber 182 and into lower working chamber 46 through passage 186 and sleeve 78. A portion of the fluid flow will flow through passage 188 into lower chamber 184. Because passage 192 has a flow resistance, fluid pressure will rise in lower chamber 184. The increase in fluid pressure in lower chamber 184 will move valve body 172 towards valve seat 190 defined by housing 170. Valve body 172 will move towards valve seat 190 because the area on valve body 172 below diaphragm 176 is larger than the area on the one or more valve discs 174 and the upper surface of valve body 172. When valve body 172 moves upward toward valve seat 190 the fluid flow between the one or more valve discs 174 and valve seat 190 will be throttled as a result of which less fluid will move into upper chamber 182 which will result in a damping load being generated.

Because the filling of lower chamber 184 takes time, the throttling of the one or more valve discs 174 is time dependent. This closing movement is also pressure dependent. Closure will take place faster with a higher fluid flow from fluid passage 162. However, the time characteristic is more important. As valve body 172 moves upward, the contact surface with diaphragm 176 is smaller since diaphragm 176 separates from valve body 172 near the outer edges of valve body 172. As a result, the effective surface area of valve body 172 upon which fluid pressure in lower chamber 184 reacts against decreases. The sizing of the components is such that when the pressure in lower chamber 184 increases, the effective surface area on which the pressure in lower chamber acts decreases in such a way that a gradual closing effect at valve seat 190 and the one or more valve discs 174 is obtained. When lower chamber 184 is at its least volume (when valve body 172 is at its lowest portion), there will be a soft damping load generated because the load on the one or more valve discs 174 is lowest. When valve body 172 moves upward, the load on the one or more valve discs 174 increases which increases the generated damping load from a soft damping load to a firm damping load. The transition from the soft damping load to the firm damping load over time can be controlled to be proportional or logarithmic. A frequency-dependent characteristic of the damping can be achieved by this construction.

Figure 5:
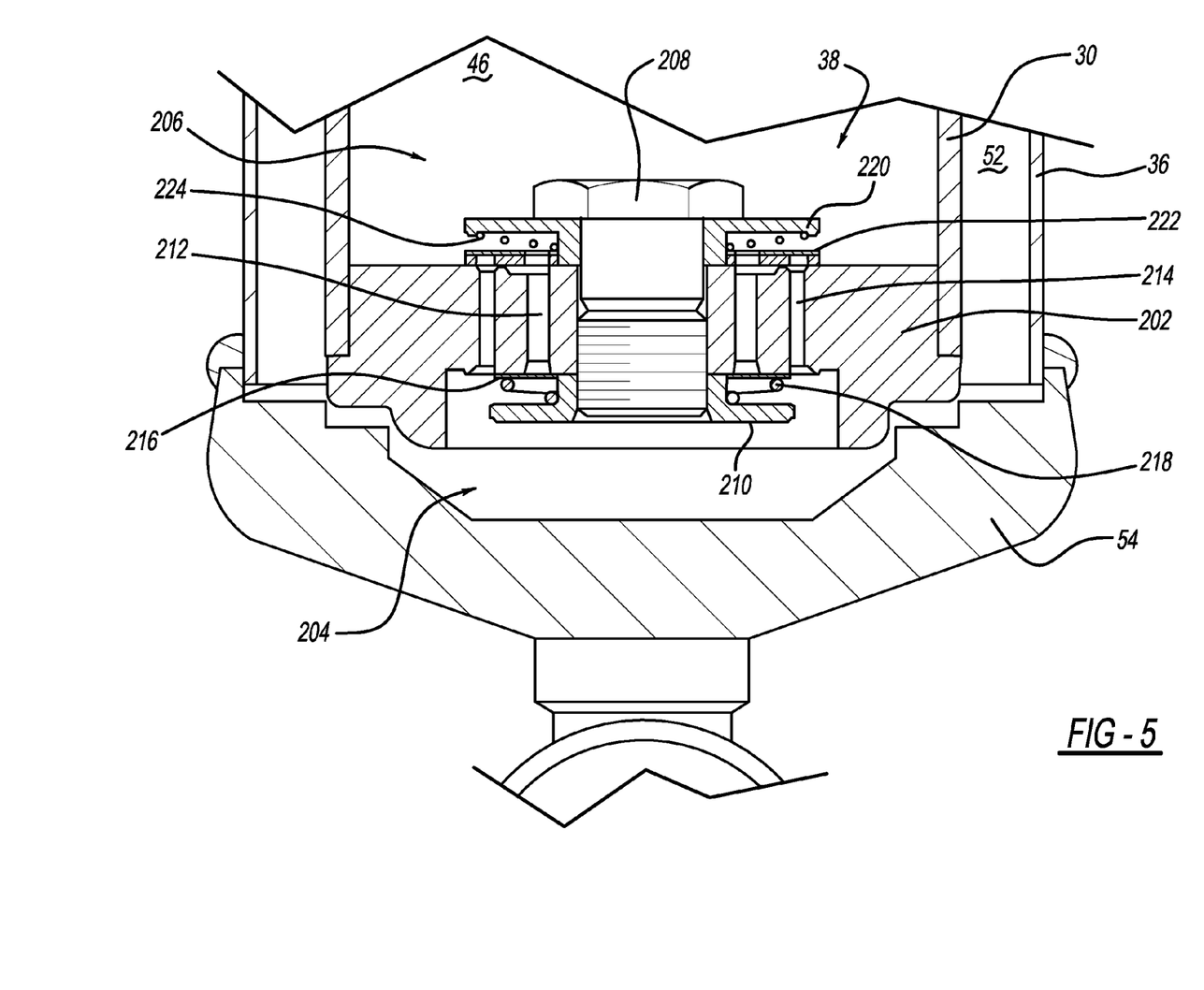
FIG. 5 is an enlarged cross-sectional view of the base valve assembly in accordance with the present disclosure.

Referring to FIG. 5, base valve assembly 38 comprises a valve body 202, a compression valve assembly 204 and a rebound valve assembly 206. Compression valve assembly 204 and rebound valve assembly 206 are attached to valve body 202 using a bolt 208 and a nut 210 or a rivet. Valve body 202 defines a plurality of compression passages 212 and a plurality of rebound passages 214.

Compression valve assembly 204 comprises one or more valve discs 216 that are biased against valve body 202 by a spring 218 which is disposed between nut 210 and the one or more valve discs 216. During a compression stroke, fluid in lower working chamber 46 is pressurized and the fluid pressure within compression passages 212 will eventually open compression valve assembly 204 by overcoming the load generated by spring 218 and displacing the one or more valve discs 216 with respect to valve body 202. Compression valve assembly 204 will open to allow fluid flow from lower working chamber 46 to reservoir chamber 52.

Rebound valve assembly 206 comprises a support washer 220, a valve disc 222 and a spring 224. Valve disc 222 abuts valve body 202 and closes rebound passages 214. Spring 224 is disposed directly between valve disc 222 and support washer 220 and support washer 220 is disposed directly between valve body 202 and bolt 208. During a rebound stroke, fluid in lower working chamber 46 is reduced in pressure causing fluid pressure in reservoir chamber 52 to react against valve disc 222. When the fluid pressure against valve disc 222 overcomes the biasing load of spring 224, valve disc 222 separates from valve body 202 to open rebound passages 214 and allow fluid flow from reservoir chamber 52 to lower working chamber 46. Typically only a small fluid pressure acting on valve disc 222 will cause the deflection of valve disc 222 and rebound valve assembly 206 acts as a check valve between reservoir chamber 52 and lower working chamber 46 and doesn't generate a damping load or only partially generates a damping load.

Referring now to FIG. 6, a piston assembly 232 in accordance with another embodiment of the present disclosure is illustrated. As discussed above, tunable bleed restriction 64 can be replaced by passive damping valve assembly 70. Piston assembly 232 comprises firm damping valve assembly 60, control valve assembly 62, passive damping valve assembly 70 and frequency dependent damping valve assembly 66. Firm damping valve assembly 60, control valve assembly 62 and frequency dependent damping valve assembly 66 are described above.

Passive damping valve assembly 70 is similar to firm damping valve assembly 60 except that passive damping valve assembly provides a soft damping characteristic where firm damping valve assembly provides a firm damping characteristic.

Passive damping valve assembly 70 comprises a piston body 280, a rebound valve assembly 282 and a compression valve assembly 284. Piston body 280 is assembled between control valve assembly 62 and firm damping valve assembly 60. Piston rod assembly 34 comprises a main piston rod 86 and an intermediate piston rod assembly 288.

Piston body 280 defines a plurality of rebound passages 290 and a plurality of compression passages 292.

Rebound valve assembly 282 comprises a valve disc 296, an interface 298, one or more interface discs 300, and a retainer 302. Valve disc 296 directly engages piston body 280 to close the plurality of rebound passages 290. Interface 298 directly engages the side of valve disc 296 opposite to piston body 280. The one or more interface discs 300 directly engage interface 298 and the one or more interface discs 300 create a biasing load that urges interface 298 towards valve disc 296 and valve disc 296 into engagement with piston body 280. Retainer 302 is moved axially along intermediate piston rod assembly 288 to adjust the load created by the one or more interface discs 300. Once the specified load is created, retainer 302 is secured to intermediate piston rod assembly 288 such that the specified load is created. During a rebound stroke, fluid pressure in upper working chamber 44 and within the plurality of rebound passages 290 will increase and fluid will flow through third flow path 76 when control valve assembly 62 is open. Fluid will flow from upper working chamber 44 through sleeve 78 and will eventually overcome the load created by the one or more interface discs 300. Once the pressure increases both the entire valve disc 296 and the entire interface 298 will move axially with respect to intermediate piston rod assembly 288 to open the plurality of rebound passages 290 only when control valve assembly 62 is open. When control valve assembly 62 is closed, fluid flow through passive damping valve assembly 70 will be prohibited.

Compression valve assembly 284 comprises valve disc 296, interface 298, the one or more interface discs 300, and retainer 302. Valve disc 296 directly engages piston body 280 to close the plurality of compression passages 292. Interface 298 directly engages the side of valve disc 296 opposite to piston body 280. The one or more interface discs 300 directly engage interface 298 and the one or more interface discs 300 create a biasing load that urges interface 298 towards valve disc 296 and valve disc 296 into engagement with piston body 280. Retainer 302 is moved axially along intermediate piston rod assembly 288 to adjust the load created by the one or more interface discs 300. Once the specified load is created, retainer 302 is secured to intermediate piston rod assembly 288 such that the specified load is created. During a compression stroke, fluid pressure in lower working chamber 46 and within the plurality of compression passages 292 will increase and fluid will flow through third flow path 76 when control valve assembly 62 is open. Fluid will flow from lower working chamber 46, through sleeve 78, through fluid passage 164 and will eventually overcome the load created by the one or more interface discs 300. Once the pressure increases both the entire valve disc 296 and the entire interface 298 will move axially with respect to intermediate piston rod assembly 288 to open the plurality of compression passages 292 only when control valve assembly 62 is open. When control valve assembly 62 is closed, fluid flow through passive damping valve assembly 70 will be prohibited.

Intermediate piston rod assembly 288 comprises a first sleeve 310, a second sleeve 312, a third sleeve 314 and a fourth sleeve 316. First sleeve 310 extends through retainer 302 and slider 138 directly engages valve seat 154 which is defined by retainer 302 and first sleeve 310. First sleeve 310 defines a first portion of fluid passage 164. Second sleeve 312 is disposed between first sleeve 310 and interface plate 150. Second sleeve 312 defines a second portion of fluid passage 164. Interface plate 150 is the same as discussed above but in this embodiment interface plate 150 extends between second sleeve 312 and frequency dependent damping valve assembly 66 as described above.

Third sleeve 314 extends from interface plate 150 generally coaxial with central tube 160 of interface plate 150. Third sleeve 314 defines a third portion of fluid passage 164. Fourth sleeve 316 extends from third sleeve 314 to housing 170 of frequency dependent damping valve assembly 66. Fourth sleeve 316 defines a fourth portion of fluid passage 164 and further defines a fluid passage 320 which extends between fourth sleeve 316 and housing 170 to allow fluid flow from fluid passage 164 to lower working chamber 46 through sleeve 78.

The operation and function of piston assembly 232 is the same as described above for piston assembly 32.

Figure 7:
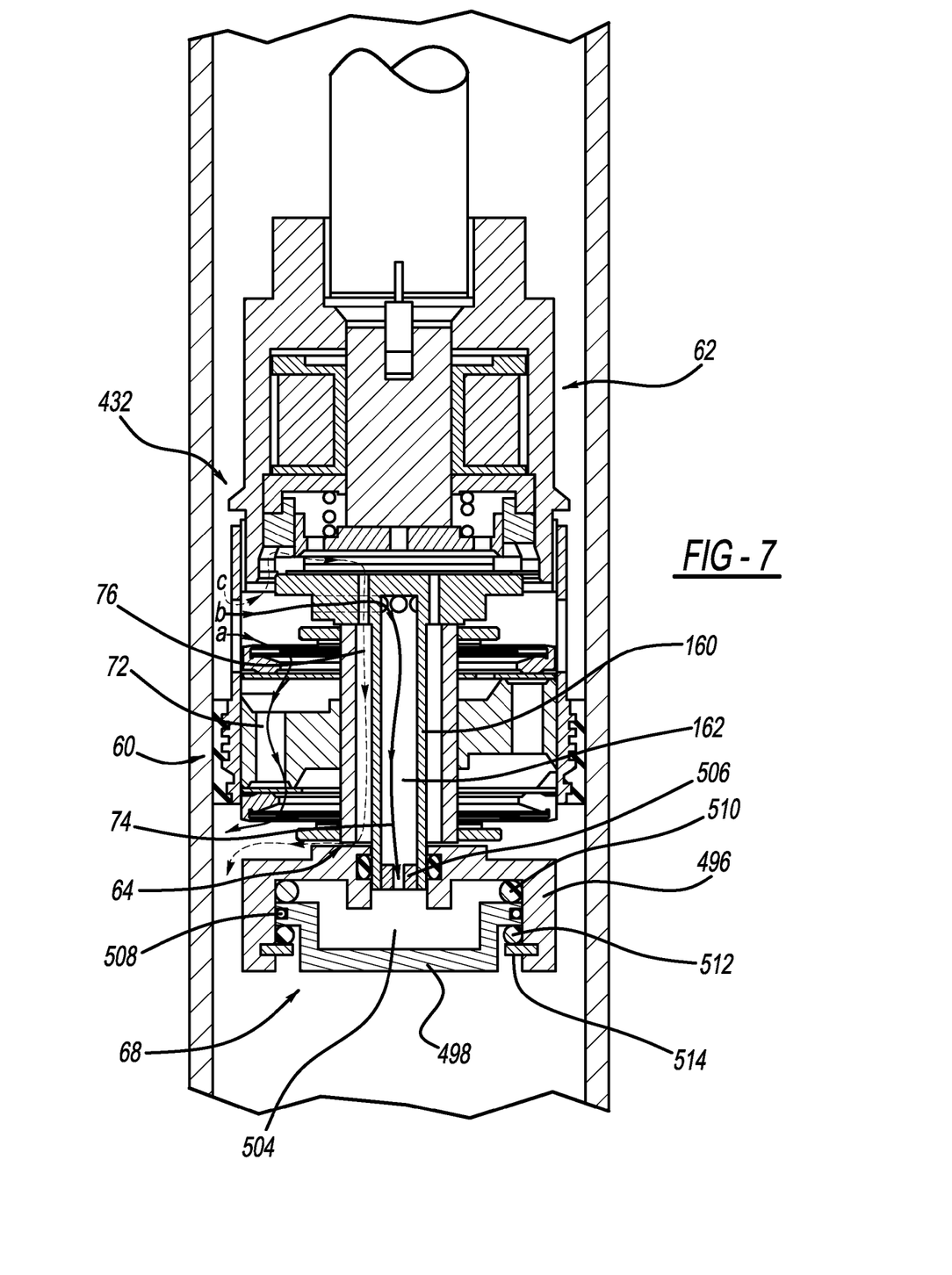
FIG. 7 is an enlarged cross-sectional view of a piston assembly in accordance with another embodiment of the present disclosure.

Referring now to FIG. 7, a piston assembly 432 in accordance with another embodiment of the present disclosure is illustrated. As discussed above, frequency dependent damping valve assembly 66 can be replaced by stroke dependent valve assembly 68. Piston assembly 432 comprises firm damping valve assembly 60, control valve assembly 62, tunable bleed restriction 64 and stroke dependent valve assembly 68. Firm damping valve assembly 60, control valve assembly 62 and tunable bleed restriction 64 are described above.

Stroke dependent valve assembly 68 comprises a housing 496 and a sliding piston 498. Fluid passage 162 includes a restriction 506 which controls the amount of fluid flow through fluid passage 162. Housing 496 is a cup shaded housing received onto central tube 160 by threading, welding or other means known in the art. Sliding piston 498 is slidingly received within housing 496 to define chamber 504. A seal 508 is disposed between piston 498 and housing 496 to permit sliding movement of piston 498 with respect to housing 496 without generating undue frictional forces as well as sealing chamber 504 from lower working chamber 46. A first rubber ring 510 is disposed between piston 498 and housing 496. A second rubber ring 512 is disposed between piston 498 and a retaining ring 514. Retaining ring 514 maintains the assembly of piston 498 while providing a reaction point for rubber ring 512. Rubber rings 510 and 512 limit the movement of piston 498 and provide for the smooth transition between soft and firm damping as will be described later herein.

During a compression stroke fluid pressure within lower working chamber 46 reacts against the bottom of piston 498 compressing fluid within chamber 504 causing fluid flow from chamber 504 through fluid passage 162 to upper working chamber 44. The amount of fluid flow will be determined by the amount of pressure built up within lower working chamber 46 and chamber 504, the amount of free movement of piston 498 between rings 510 and 512 and the spring rate created by the compression of ring 510. As the amount or rate of the compression stroke increases, the fluid flow through fluid passage 162 will gradually decrease to provide a smooth transition from an initially soft damping to a firm damping condition. The compression of ring 510 will provide the smooth transition.

During a rebound stroke fluid pressure within upper working chamber 44 flows through fluid passage 162 and into chamber 504 to react against the upper surface of piston 498 compressing fluid within chamber 504. The amount of fluid flow will be determined by the amount of pressure built up within upper working chamber 44 and chamber 504, the amount of free movement of piston 498 between rings 510 and 512 and the spring rate created by the compression of ring 512. As the amount or rate of extension increases, the fluid flow through fluid passage 162 will gradually decrease to provide a smooth transition from an initially soft damping to a firm damping condition. The compression of ring 512 will provide the smooth transition.

In each of the embodiments described above, control valve assembly 62 is described as a normally closed valve assembly that opens to allow fluid flow. It is within the scope of the present disclosure for control valve assembly to be a normally open valve assembly that allows fluid flow in the non-powered condition and which receives power to activate coil 132 to control close valve assembly 20 to restrict fluid flow.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:
1. A shock absorber comprising:
 a pressure tube forming a fluid chamber;
 a piston assembly slidably disposed within said working chamber, said piston assembly dividing said fluid chamber into an upper working chamber and a lower working chamber; said piston assembly comprising:

a first valve assembly controlling fluid flow between said upper working chamber and said lower working chamber;

a second valve assembly controlling fluid flow between said upper working chamber and said lower working chamber, said second valve assembly being in parallel with said first valve assembly; and a third valve assembly controlling fluid flow between said upper working chamber and said lower working chamber, said third valve assembly being in parallel with both said first valve assembly and said second valve assembly; wherein said third valve assembly is an active tunable flow restriction generating a soft damping characteristic.

2. The shock absorber according to claim 1, wherein said first valve assembly is a first passive damping valve assembly generating a first damping characteristic for said shock absorber.

3. The shock absorber according to claim 2, wherein said first passive damping valve assembly includes a first piston body defining at least one first fluid passageway and a first valve disc in direct fluid contact with said first piston body to close said at least one first fluid passageway.

4. The shock absorber according to claim 2, wherein said second valve assembly is a second passive damping valve assembly generating a frequency dependent damping characteristic based upon a frequency of movement of said piston assembly in said pressure tube.

5. The shock absorber according to claim 4, wherein said soft damping characteristic is softer than said first damping characteristic.

6. The shock absorber according to claim 2, wherein said second valve assembly is a passive damping valve assembly generating a stroke dependent damping characteristic based upon an amount of movement of said piston assembly in said pressure tube.

7. The shock absorber according to claim 6, wherein said soft damping characteristic is softer than said first damping characteristic.

8. The shock absorber according to claim 1, wherein said second valve assembly is a passive damping valve assembly generating a frequency dependent damping characteristic based upon a frequency of movement of said piston assembly in said pressure tube.

9. A shock absorber comprising:
a pressure tube forming a fluid chamber;
a piston assembly slidably disposed within said working chamber, said piston assembly dividing said fluid chamber into an upper working chamber and a lower working chamber; said piston assembly comprising:
  a first valve assembly controlling fluid flow between said upper working chamber and said lower working chamber;
  a second valve assembly controlling fluid flow between said upper working chamber and said lower working chamber, said second valve assembly being in parallel with said first valve assembly; and
  a third valve assembly controlling fluid flow between said upper working chamber and said lower working chamber, said third valve assembly being in parallel with both said first valve assembly and said second valve assembly; wherein said third valve assembly is an active damping valve assembly generating a soft damping characteristic.

10. The shock absorber according to claim 9, wherein said soft damping characteristic is softer than said first damping characteristic.

11. The shock absorber according to claim 10, wherein said second passive damping valve assembly includes a second piston body defining at least one second fluid passageway and a second valve disc in direct fluid contact with said second piston body to close said at least one second fluid passageway.

12. The shock absorber according to claim 9, wherein said soft damping characteristic is softer than said first damping characteristic.

13. The shock absorber according to claim 12, wherein said second passive damping valve assembly includes a second piston body defining at least one second fluid passageway and a second valve disc in direct fluid contact with said second piston body to close said at least one second fluid passageway.

14. A shock absorber comprising:
a pressure tube forming a fluid chamber;
a piston assembly slidably disposed within said working chamber, said piston assembly dividing said fluid chamber into an upper working chamber and a lower working chamber; said piston assembly comprising:
  a first valve assembly controlling fluid flow between said upper working chamber and said lower working chamber;
  a second valve assembly controlling fluid flow between said upper working chamber and said lower working chamber, said second valve assembly being in parallel with said first valve assembly; and
  a third valve assembly controlling fluid flow between said upper working chamber and said lower working chamber, said third valve assembly being in parallel with both said first valve assembly and said second valve assembly; wherein
said second valve assembly is a passive damping valve assembly generating a frequency dependent damping characteristic based upon a frequency of movement of said piston assembly in said pressure tube; and
said third valve assembly is an active tunable flow restriction generating a second damping characteristic, said second damping characteristic being softer than said first damping characteristic.

15. A shock absorber comprising:
a pressure tube forming a fluid chamber;
a piston assembly slidably disposed within said working chamber, said piston assembly dividing said fluid chamber into an upper working chamber and a lower working chamber; said piston assembly comprising:
  a first valve assembly controlling fluid flow between said upper working chamber and said lower working chamber;
  a second valve assembly controlling fluid flow between said upper working chamber and said lower working chamber, said second valve assembly being in parallel with said first valve assembly; and
  a third valve assembly controlling fluid flow between said upper working chamber and said lower working chamber, said third valve assembly being in parallel with both said first valve assembly and said second valve assembly; wherein
said second valve assembly is a passive damping valve assembly generating a frequency dependent damping characteristic based upon a frequency of movement of said piston assembly in said pressure tube; and
said third valve assembly is an active damping valve assembly generating a second damping characteristic, said second damping characteristic being softer than said first damping characteristic.

16. The shock absorber according to claim 15, wherein said second passive damping valve assembly includes a second piston body defining at least one second fluid passageway and a second valve disc in direct fluid contact with said second piston body to close said at least one second fluid passageway.

17. A shock absorber comprising:
a pressure tube forming a fluid chamber;
a piston assembly slidably disposed within said working chamber, said piston assembly dividing said fluid chamber into an upper working chamber and a lower working chamber; said piston assembly comprising:
a first valve assembly controlling fluid flow between said upper working chamber and said lower working chamber;
a second valve assembly controlling fluid flow between said upper working chamber and said lower working chamber, said second valve assembly being in parallel with said first valve assembly; and
a third valve assembly controlling fluid flow between said upper working chamber and said lower working chamber, said third valve assembly being in parallel with both said first valve assembly and said second valve assembly; wherein
said second valve assembly is a passive damping valve assembly generating a stroke dependent damping characteristic based upon an amount of movement of said piston assembly in said pressure tube.

18. The shock absorber according to claim 17, wherein said third valve assembly is an active damping valve assembly generating a second damping characteristic, said second damping characteristic being softer than said first damping characteristic.

19. The shock absorber according to claim 18, wherein said second passive damping valve assembly includes a second piston body defining at least one second fluid passageway and a second valve disc in direct fluid contact with said second piston body to close said at least one second fluid passageway.

20. The shock absorber according to claim 17, wherein said third valve assembly is an active tunable flow restriction generating a second damping characteristic, said second damping characteristic being softer than said first damping characteristic.

* * * * *